United States Patent
Matsui

(10) Patent No.: US 8,228,945 B2
(45) Date of Patent: Jul. 24, 2012

(54) STREAMING COMMUNICATION SYSTEM

(75) Inventor: Kuniaki Matsui, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 70 days.

(21) Appl. No.: 12/447,702

(22) PCT Filed: Oct. 18, 2007

(86) PCT No.: PCT/JP2007/070328
§ 371 (c)(1),
(2), (4) Date: Apr. 29, 2009

(87) PCT Pub. No.: WO2008/062621
PCT Pub. Date: May 29, 2008

(65) Prior Publication Data
US 2010/0067525 A1 Mar. 18, 2010

(30) Foreign Application Priority Data
Nov. 20, 2006 (JP) ................................. 2006-312722

(51) Int. Cl.
*H04J 3/16* (2006.01)
(52) U.S. Cl. ...................................................... 370/468
(58) Field of Classification Search .................. None
See application file for complete search history.

(56) References Cited

U.S. PATENT DOCUMENTS

| 7,151,749 | B2 * | 12/2006 | Vega-Garcia et al. ..... 370/241.1 |
| 2002/0114277 | A1 | 8/2002 | Kyusojin |
| 2003/0097460 | A1 * | 5/2003 | Higashiyama et al. ....... 709/232 |
| 2005/0180426 | A1 | 8/2005 | Sakata et al. |

FOREIGN PATENT DOCUMENTS

| JP | 2001-77856 A | 3/2001 |
| JP | 2002-185509 A | 6/2002 |
| JP | 2003-158543 A | 5/2003 |
| JP | 2003-218929 A | 7/2003 |
| JP | 2004-80612 A | 3/2004 |
| JP | 2004-274700 | 9/2004 |
| JP | 2005-167514 A | 6/2005 |
| JP | 2005-210347 A | 8/2005 |
| JP | 2005-269622 A | 9/2005 |

OTHER PUBLICATIONS

Goto et al., "Study of Movie Application using RSVP", Information Processing Society of Japan Kenkyu Hokoku, Nov. 7, 1997, vol. 97, No. 104, pp. 115-120, IPSJ SIG Notes.

* cited by examiner

*Primary Examiner* — Nittaya Juntima
*Assistant Examiner* — Leon Andrews
(74) *Attorney, Agent, or Firm* — Birch, Stewart, Kolasch & Birch, LLP

(57) ABSTRACT

A streaming communication apparatus transmits a packet requesting reservation of a bandwidth required for streaming communication towards a communication relay apparatus. The communication relay apparatus reserves a required bandwidth according to the request packet. Accordingly, stable streaming communication can be carried out.

16 Claims, 5 Drawing Sheets

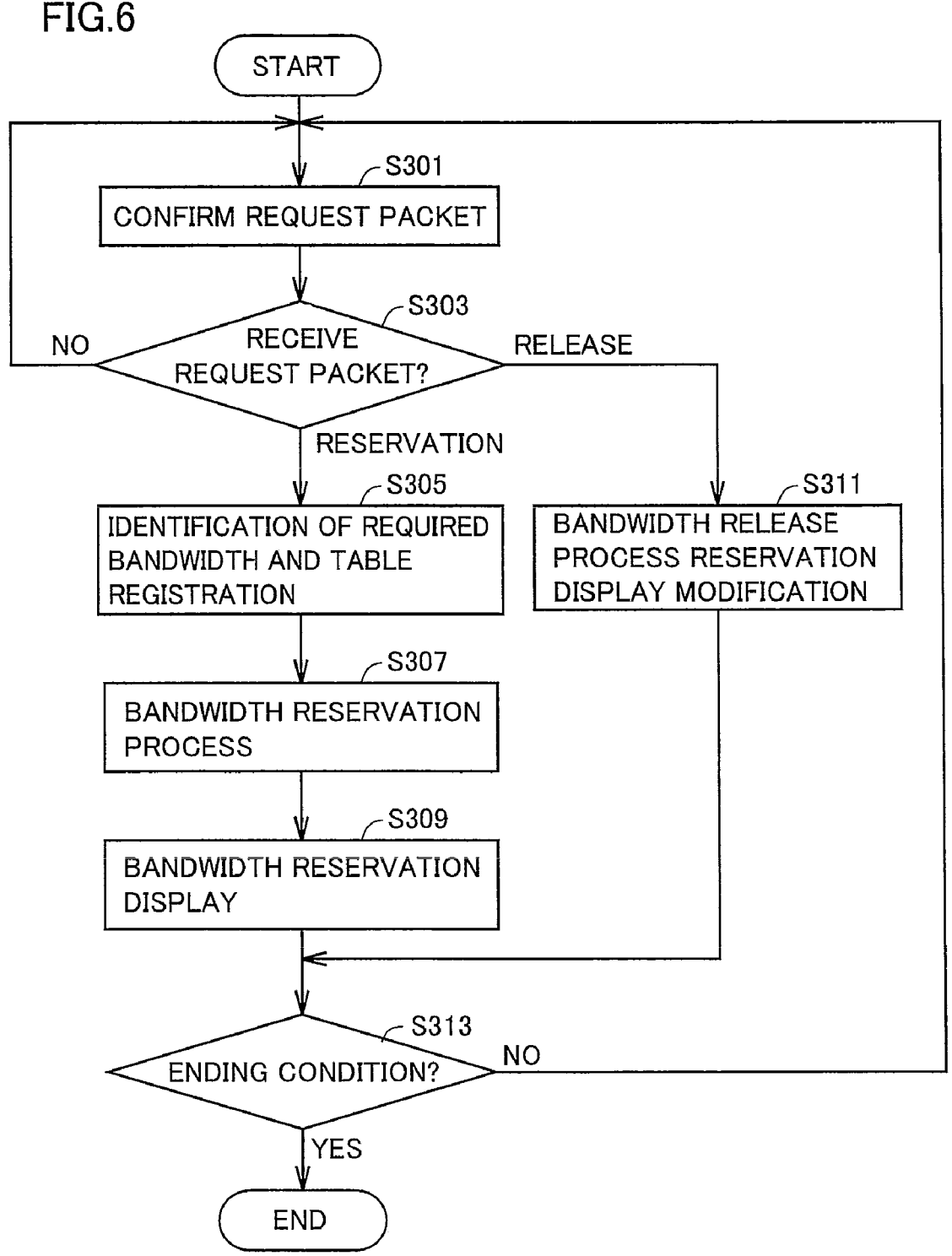

STREAMING COMMUNICATION SYSTEM

TECHNICAL FIELD

The present invention relates to streaming communication systems.

BACKGROUND ART

In accordance with the spread of broadband communication in these years, the event of reproducing video and audio through the Internet utilizing streaming technique is increasing. In the case where streaming data such as video and audio is distributed via the Internet, the streaming data is divided into a plurality of packets for distribution. The client uses his/her device such as a PC (Personal Computer) to take out the data from the received packets to reconstruct the data for reproduction.

On the Internet, the communication of various applications is present on one IP (Internet Protocol) network. Accordingly, there are cases where the communication speed is degraded when the network is crowded or the like. This will lead to disturbance in data reproduction in the communication where reception of a packet is required in real time such as in the case of streaming communication.

In this context, there is proposed the technique to monitor all the packets through a router to search for a streaming packet of video, audio and the like to carry out bandwidth control according to the identified packet.

For example, Patent Document 1 discloses a communication control apparatus (home router) provided at the interface of the WAN (Wide Area Network) side/LAN (Local Area Network) side, capable of bandwidth measurement, communication flow monitoring, bandwidth calculation and bandwidth control. The communication control apparatus ensures the QoS (Quality of Service) of the streaming communication for a television or the like connected in parallel.

Patent Document 2 discloses a streaming data communication system including a server for distributing streaming data, and a streaming data communication apparatus receiving streaming data. The streaming data communication apparatus determines the proper bit rate according to the test data packet transmitted from a server.

Patent Document 1: Japanese Patent Laying-Open No. 2005-210347

Patent Document 2: Japanese Patent Laying-Open No. 2005-167514

DISCLOSURE OF THE INVENTION

Problems to be Solved by the Invention

According to the technique set forth above, the router reserves the required bandwidth for streaming communication. However, the load on the part of the router is significantly great in order to analyze all the packets and find a trigger for streaming.

There is the possibility that a protocol not known by the router may be used depending upon the communication. It was difficult to identify the initiation and end of streaming communication as well as the required bandwidth properly by just a router.

Furthermore, in the case where a large number of streaming communications occurs at the same time, there will be great competition for the bandwidth if control is based on only the priority level of the packets. It was difficult to allocate the optimum bandwidth for each streaming communication.

The present invention is directed to solving the aforementioned problems. An object of the present invention is to provide a streaming communication system carrying out bandwidth control efficiently.

Means for Solving the Problems

According to an aspect of the present invention, a streaming communication system includes a plurality of streaming communication apparatuses for streaming communication, and a communication relay apparatus for controlling relay of a data packet between apparatuses connected on a network. Each streaming communication apparatus includes a communication unit for transmitting and receiving a data packet, and a request packet transmission unit for transmitting to the communication relay apparatus a request packet instructing bandwidth control for streaming communication. The communication relay apparatus includes a request packet reception unit for receiving a request packet, and a bandwidth control unit for carrying out bandwidth control of a data packet according to the request packet.

Preferably, the request packet is a reservation request packet including an instruction to reserve a bandwidth for streaming communication on the network.

Preferably, the communication relay apparatus further includes a display process unit for notifying a user that the bandwidth control unit is carrying out control according to the reservation request packet received by the request packet reception unit.

Preferably, the communication relay apparatus further includes a display process unit for displaying a physical port where the bandwidth control unit carries out control according to the reservation request packet received by the request packet reception unit.

Preferably, the request packet transmission unit uses an IP packet as the reservation request packet.

Preferably, the streaming communication apparatus further includes a data storage unit for storing data used in streaming communication, and a data determination unit for determining the bandwidth required for streaming communication in a compression format of data stored in the data storage unit. The request packet transmission unit transmits the reservation request packet based on a determination result by the data determination unit.

Preferably, the data determination unit determines a bandwidth required for streaming communication in the compression format of a data packet in response to reception of a data packet by the communication unit.

Preferably, the data determination unit includes a table in which the compression format of data and a bandwidth required for the compression format are set in correspondence. The data determination unit determines the required bandwidth based on the table.

Preferably, the data determination unit determines the compression format of a data packet based on a payload type of the data packet used in streaming communication.

Preferably, the streaming communication uses an SIP protocol. The data determination unit determines the initiation of streaming communication and the compression format of a data packet based on offer SDP information including a method and a response message to the method.

Preferably, the bandwidth control unit carries out control of reserving a bandwidth with respect to an address of the streaming communication apparatus from which the reservation request packet is transmitted in response to reception of the reservation request packet by the request packet reception unit.

Preferably, the communication relay apparatus further includes a storage unit for storing, in association with the reservation request packet from a plurality of streaming communication apparatuses, an address of the streaming communication apparatus from which each reservation request packet has been transmitted and the bandwidth required for streaming communication, included in each reservation request packet, in correspondence.

Preferably, the bandwidth control unit carries out, when bandwidth control is carried out for a plurality of streaming communication apparatuses, bandwidth control based on the reservation request packet with respect to an address of the streaming communication apparatus among the plurality of streaming communication apparatuses from which the reservation request packet has been transmitted, and control of allocating a remaining bandwidth equally with respect to the address of the remaining streaming communication apparatuses.

Preferably, the communication relay apparatus further includes a display process unit for displaying the address of the streaming communication apparatus whose bandwidth control unit is carrying out control of reserving a bandwidth and the reserved bandwidth in correspondence.

Preferably, the request packet is a release request packet including an instruction to release the bandwidth for streaming communication.

Preferably, the bandwidth control unit carries out control of releasing a reserved bandwidth with respect to the address of a streaming communication apparatus from which the release request packet has been transmitted in response to reception of a release request packet by the request packet reception unit.

Preferably, the bandwidth control unit carries out, when control is carried out of reserving the bandwidth with respect to an address of a plurality of streaming communication apparatuses, control of releasing the bandwidth reserved with respect to an address of a predetermined streaming communication apparatus among the plurality of streaming communication apparatuses in response to the request packet reception unit receiving a release request packet from the predetermined streaming communication apparatus.

Preferably, the request packet transmission unit uses an IP packet as a release request packet.

Preferably, each streaming communication apparatus and the communication relay apparatus are connected by a local area network.

Effects of the Invention

According to the present invention, bandwidth control is carried out efficiently in streaming communication. Accordingly, stable streaming communication can be carried out.

BRIEF DESCRIPTION OF THE DRAWINGS

FIG. 6 is a flowchart of a process carried out by a router apparatus according to an embodiment of the present invention.

DESCRIPTION OF THE REFERENCE SIGNS

Figure 1:
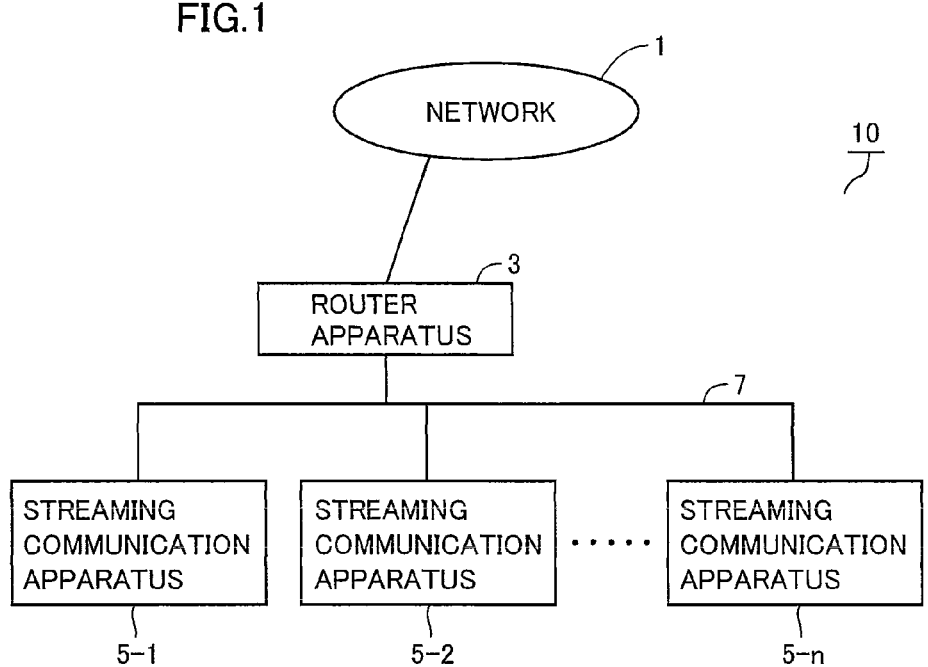
FIG. 1 represents an example of a configuration of a network to which a streaming communication system according to an embodiment of the present invention is applied.

1 network; 3 router apparatus (communication relay apparatus); 5 streaming communication apparatus; 7 LAN; 10 streaming communication system; 106 display unit; 109 communication I/F unit; 110 bandwidth reservation/release request transmission unit; 111 packet monitor and session information process unit; 112 audio video process unit; 113 LAN communication I/F unit; 114 bandwidth reservation display unit; 115 bandwidth allocation control process unit; 116 bandwidth allocation table; 117 WAN communication I/F unit; 118 required bandwidth retrieval table; 119 memory device

BEST MODE FOR CARRYING OUT THE INVENTION

An embodiment of the present invention will be described hereinafter with reference to the drawings. In the following, the same component has the same reference character allotted. Their destination and function are also identical. Therefore, detailed description thereof will not be repeated.

According to the present invention, a streaming communication apparatus transmits a packet requesting reservation of a bandwidth required for streaming communication towards a communication relay apparatus (hereinafter, referred to as "router apparatus"), as will be described hereinafter. The router apparatus reserves the required bandwidth according to the request packet. Accordingly, stable streaming communication can be carried out.

FIG. 1 represents an example of a configuration of a network to which a streaming communication system 10 of the present embodiment is applied.

A configuration of the network to which streaming communication system 10 according to the present embodiment is applied will be described with reference to FIG. 1.

Streaming communication system 10 includes streaming communication apparatuses 5-1 to 5-*n* capable of streaming communication, and a router apparatus 3 that carries out bandwidth control for streaming communication apparatuses 5-1 to 5-*n*.

Router apparatus 3 is directly connected to a network 1 such as WAN (Wide Area Network) or the Internet. Alternatively, router apparatus 3 may be connected onto network 1 via an ISP (Internet Service Provider) gateway not shown. Further, router apparatus 3 and streaming communication apparatuses 5-1 to 5-*n* are connected via a LAN 7. LAN 7 may be a wired LAN or wireless LAN. In the following, streaming communication apparatuses 5-1 to 5-*n* will be simply indicated as streaming communication apparatus 5, unless stated otherwise. It is to be noted that router apparatus 3 can also be connected to other apparatuses.

Streaming communication system 10 constitutes one local network, and can be considered as a network at a local area such as home, the office, and the like.

Streaming communication apparatus 5 is connected to various communication apparatuses on the side of network 1 such as to a server device for communication. Streaming communication apparatus 5 may also function as a server device and distribute streaming data by itself. Streaming communication apparatus 5 is, for example, a PC or an IP phone.

Router apparatus 3 carries out control of the plurality of data communications executed between a communication apparatus on the side of network 1 and streaming communication apparatus 5.

Network 1 is a best effort network that does not ensure the communication speed attainable by the user, different from the subscriber's telephone network. Therefore, an apparatus connected on network 1 will operate thoroughly to use the circuit capacity, if in excess. Although the transmission efficiency will be improved for Web access and file transfer, inconvenience may occur such as disturbance in data reproduction in applications that must retain a predetermined bandwidth such as in streaming communication.

In order to carry out stable streaming communication, bandwidth control must be carried out appropriately by a router apparatus or the like. In streaming communication system 10 of the present embodiment, notification of a bandwidth required for streaming communication is made from streaming communication apparatus 5 towards router apparatus 3. Router apparatus 3 carries out control of reserving the bandwidth according to the notification. Accordingly, streaming communication apparatus 5 can execute stable streaming communication.

Figure 2:
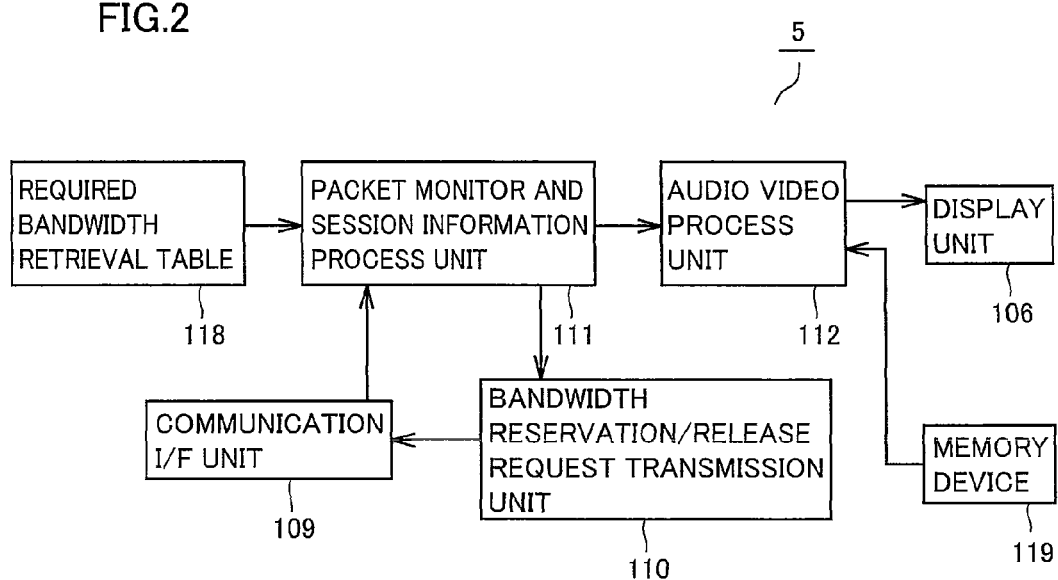
FIG. 2 is a functional block diagram representing the functional configuration of a streaming communication apparatus in a streaming communication system according to an embodiment of the present invention.

FIG. 2 is a functional block diagram representing the functional configuration of streaming communication apparatus 5.

The function of streaming communication apparatus 5 will be described with reference to FIG. 2.

Streaming communication apparatus 5 includes a communication interface unit (hereinafter, referred to as "communication I/F unit") 109, a bandwidth reservation/release request transmission unit 110, a required bandwidth retrieval table 118, a packet monitor and session information process unit 111, an audio video process unit 112, and a display unit 106.

Communication I/F unit 109 is the interface for transmitting and receiving a packet.

Packet monitor and session information process unit 111 monitors the packet received by communication I/F unit 109 to determine whether the received packet is an initiation packet of streaming communication (for example, reception of IP voice communication, IPTV phone, and the like). When a session (communication) is established by the initiation packet, the circuit status is periodically measured. Packet monitor and session information process unit 111 uses required bandwidth retrieval table 118 to calculate a bandwidth required for streaming communication based on the aforementioned determination or measured result, and notifies bandwidth reservation/release request transmission unit 110 of the bandwidth. When detection is made that communication has ended, bandwidth reservation/release request transmission unit 110 is notified to release the reserved bandwidth.

In the case where streaming communication is initiated from itself, the required bandwidth is directly notified to bandwidth reservation/release request transmission unit 110 since the communication scheme is already known. As used herein, "communication scheme" refers to the compression format such as MP4V (corresponding to MPEG4: Moving Picture Experts Group phase 4) and PCMU (corresponding to G.711µ-law).

Details of the process for packet monitor and session information process unit 111 to determine an initiation packet and measure the circuit status will be described in detail afterwards.

Required bandwidth retrieval table 118 is a table in which a data compression format and the bandwidth required for each compression format are set in association. In the case of an IP phone, for example, 64 kbps, 64 kbps, and 8 kbps are set in correspondence with G. 711, G. 722, and G. 729, respectively. The table may include only compression formats that can be accommodated thereby. Packet monitor and session information process unit 111 searches for a compression format defined in required bandwidth retrieval table 118 based on the data compression format included in the received initiation packet to determine the required bandwidth.

Bandwidth reservation/release request transmission unit 110 transmits a request packet requesting reservation of the required bandwidth notified by packet monitor and session information process unit 111 to router apparatus 3 via communication I/F unit 109. In the case where release of a bandwidth is notified from packet monitor and session information process unit 111, a request packet requesting release of the bandwidth is transmitted to router apparatus 3 via communication I/F unit 109. The method of transmitting a request packet includes transmitting a packet to the IP address of router apparatus 3 obtained by DHCP (Dynamic Host Configuration Protocol), or transmitting a packet to the network address. It is assumed that the packet to be transmitted is an IP packet stored with information required to identify the other apparatus for communication (IP address, network address, or the like) in the header.

Audio video process unit 112 carries out a reproduction process of the transmitted data upon rearranging the order of the packet based on the header information and the like in the received packet. Furthermore, the reproduction data is provided to display unit 106. Alternatively, the audio and video data stored in memory device 119 is divided into packets to allow streaming communication.

Display unit 106 provides display of reproduction data applied from audio video process unit 112. For example, a liquid crystal display or CRT (Cathode Ray Tube) display constitutes the display unit.

The process carried out by packet monitor and session information process unit 111 will be described in detail hereinafter.

Figure 3:
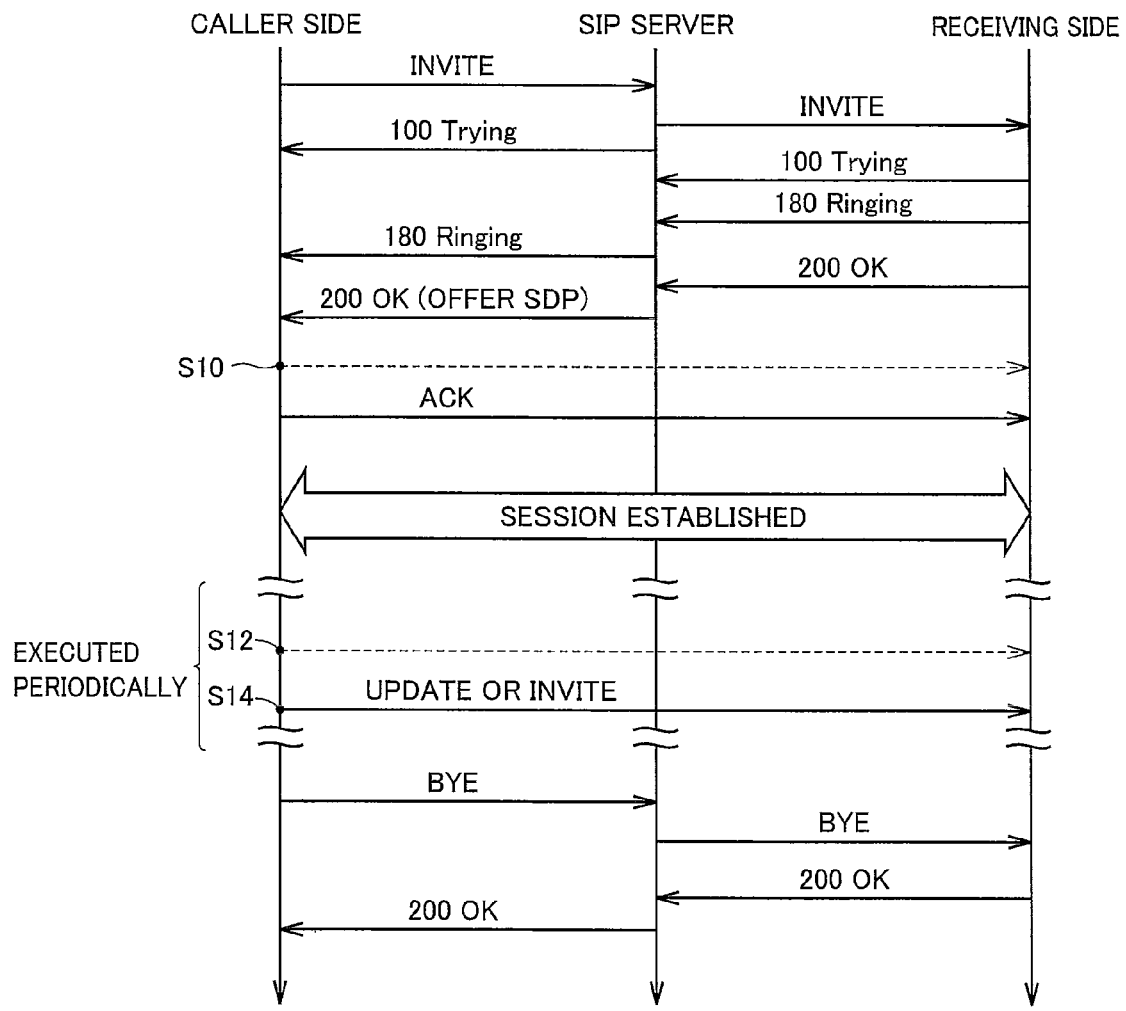
FIG. 3 is a sequence diagram to describe determination of an initiation packet and measurement of the line status according to an embodiment of the present invention.

FIG. 3 is a sequence diagram to describe determination of an initiation packet and measurement of a circuit status.

An example of determining an initiation packet and measuring a circuit status by packet monitor and session information process unit 111 will be described with reference to FIG. 3.

Streaming communication system 10 of FIG. 1 requires a call control procedure as shown in FIG. 3 to establish connection between a communication apparatus on the side of network 1 and streaming communication apparatus 5 prior to communication. In the present embodiment, an SIP (Session Initiation Protocol) is used as the protocol for this call control.

Prior to an explanation based on FIG. 3, SIP will be described. An SIP is a protocol representing the procedure of opening, modifying, and ending a session. An SIP includes a message called "method" such as "connection request message (INVITE)", "acknowledgement response message (ACK)", and "end request message (BYE)", and a response message for responding to a method. For example, "connection request message (INVITE)" is used to initiate communication with another apparatus. A response message has a response code defined depending on the contents such as "1xx" for provisional response, "2xx" for confirmed response, and the like.

An SIP message includes: (1) start line, (2) header field, (3) empty line, and (4) body (hereinafter, also called "payload" appropriately).

The contents of the method is indicated in (1) start line. Various information indicating the reception destination or transmission source (for example, SIP URI (Uniform Resource Identifier)) is added, as necessary, into (2) header field. (3) empty line serves to delimit the header from the body. Communication information such as the communication scheme supported by itself, the bandwidth usage time, the port number used for communication and the like are described in SDP (Session Description Protocol) in (4) body.

FIG. 3 will be described based on an IP phone set as a communication apparatus.

SIP messages are transferred between a communication apparatus on part of network 1 (the communication apparatus of the caller side (hereinafter, (referred to as "caller side")) and streaming communication apparatus 5 (the communication apparatus of the receiving side (hereinafter, referred to as "receiving side")) via the SIP server.

First, the caller side transmits a connection request message (INVITE) towards the SIP server. This connection request message (INVITE) includes an IP phone number or URI specifying the caller side and receiving side. In addition, communication information of audio and/or video data to be transferred by communication is written in SDP into the body region.

The SIP server looks for the IP address of the receiving side from its own database and sends this connection request message (INVITE) to the receiving side. In addition, a trying message (100 Trying) is returned to the caller side.

Upon receiving a connection request message (INVITE), the receiving side immediately notifies the user of a reception by sounding a ringing tone and the like. At this stage, packet monitor and session information process unit 111 detects initiation of streaming communication. Based on the communication information written in the payload type, required bandwidth retrieval table 118 is referred to calculate the required bandwidth. Then, packet monitor and session information process unit 111 instructs bandwidth reservation/release request transmission unit 110 to transmit to router apparatus 3 a packet requesting reservation of the calculated required bandwidth.

In addition, the receiving side transmits a ringing message (180 Ringing) to the SIP server. This ringing message (180 Ringing) is transmitted to the caller side via the SIP server.

An off-hook operation by the user of the receiving side during this ringing state will cause a confirmed response message (200 OK) to be transmitted towards the caller side via the SIP server.

The caller side receiving the confirmed response message (200 OK) can identify the IP address of the receiving side from the offer SDP information in the message. As used herein "offer SDP information" refers to the information written in SDP in the response message. A plurality of transfer rates available in communication are described in the offer SDP information. Accordingly, an ICMP (Internet Control Message Protocol) packet is transmitted towards the IP address of the receiving side (S10). The ICMP is a protocol for a router or host located in the path to notify a disturbance on the network, when proper communication cannot be carried out. The ICMP is mainly used to confirm respective states between computers connected by TCP/IP and between network equipment.

The caller side calculates the current bandwidth from the delay time of the response with respect to the transmitted ICMP packet. Further, the fastest transfer rate in the bandwidth is selected from the offer SDP information. The caller side transmits an acknowledgement response message (ACK) in which the selected transfer rate is written in the body region to the receiving side via the SIP server. Accordingly, a session is established. At this stage, packet monitor and session information process unit 111 reads out the transfer rate from the body region in the acknowledgement response message (ACK). In the case where this transfer rate differs from the required bandwidth calculated based on the connection request message (INVITE), an instruction is issued to cause bandwidth reservation/release request transmission unit 110 to transmit to router apparatus 3 a packet requesting bandwidth reservation.

By the connection request message (INVITE) set forth above, the receiving side can identify the initiation of communication, the IP address of the other apparatus for communication, information of the compression format for audio and/or video data to be transferred, and the like. In addition, the caller side transmits an ICMP packet towards the IP address of the other apparatus to calculate a bandwidth from the delay time of the response and selects the fastest transfer rate in that bandwidth. The selected transfer rate is written into the body region of the acknowledgement response message (ACK). The caller side transmits a bandwidth reservation request packet towards router apparatus 3 based on the transfer rate written in the body region.

By transmitting data packets with the IP address of the other apparatus as the destination between the caller side and receiving side after a session is established, streaming communication is allowed. During communication, an RTP (Real-time Transport Protocol) packet, RTCP (RTP Control Protocol) packet, RTSP (Real Time Streaming Protocol) packet, and the like are to be used. The compression format may not be strictly specified as set forth above depending upon the SIP message. In this case, the compression format may be determined from the payload type of the RTP packet and the like since the communication scheme is generally described in the payload of these packets.

During the communication, the caller side transmits an ICMP packet towards the IP address of the receiving side for every predetermined time (S12). Then, the transfer rate is modified according to the circuit status. The transfer rate is selected from the offer SDP information. A connect request message (INVITE) or an update message (UPDATE) in which the selected transfer rate is described is transmitted to the receiving side (S14). Accordingly, packet monitor and session information process unit 111 instructs bandwidth reservation/release request transmission unit 110 to transmit to router apparatus 3 a packet requesting modification of the communication rate.

When the session is to be ended, the caller side transmits an end request message (BYE). The receiving side receiving the end request message (BYE) returns a confirmed response message (200 OK) to end the session. The receiving side responds to detection of communication termination and sends a packet requesting bandwidth release towards router apparatus 3.

Packet monitor and session information process unit 111 can determine the initiation of communication and the communication type from the connection request message (INVITE) and offer SDP information. Although the description set forth above is based on the case where streaming communication apparatus 5 is taken as the receiving side, bandwidth control can also be carried out at the caller side by a similar procedure.

Figure 4:
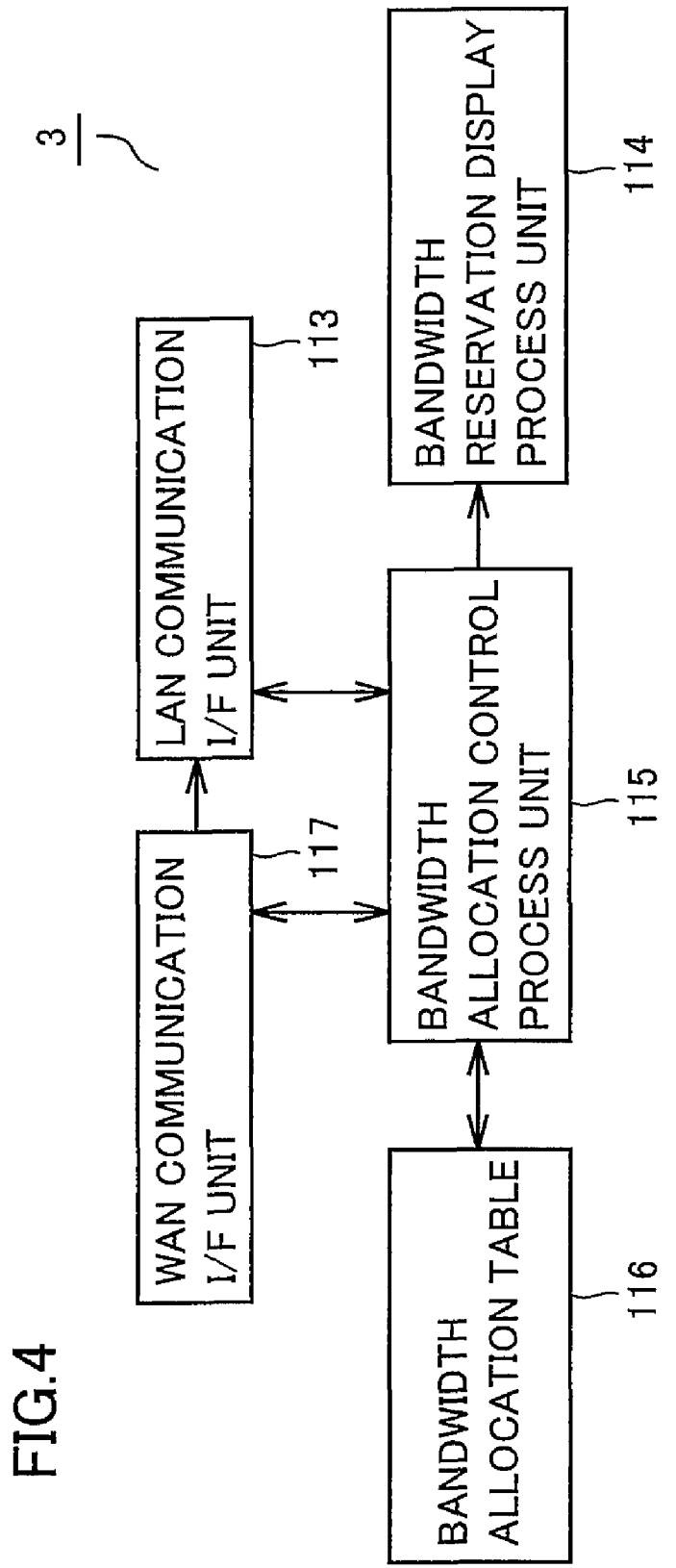
FIG. 4 is a functional block diagram representing the functional configuration of a router apparatus in a streaming communication system according to an embodiment of the present invention.

FIG. 4 is a functional block diagram representing the functional configuration of router apparatus 3.

The function of router apparatus 3 will be described with reference to FIG. 4.

Router apparatus 3 includes an LAN communication I/F unit 113, a bandwidth reservation display unit 114, a bandwidth allocation control process unit 115, a bandwidth allocation table 116, and a WAN communication I/F unit 117.

LAN communication I/F unit 113 is the interface to transmit and receive a packet to and from streaming communication apparatus 5 arranged at the LAN side.

WAN communication I/F unit 117 is connected on network 1, and is the interface to transmit and receive data to and from a server apparatus or the like connected on network 1.

Upon receiving a bandwidth reservation request packet from streaming communication apparatus 5 via LAN communication I/F unit 113, bandwidth allocation control process unit 115 registers the IP address of streaming communication apparatus 5 from which the request packet has been transmitted and the requested bandwidth in correspondence in bandwidth allocation table 116. A bandwidth reservation process is carried out with respect to the IP address. The bandwidth reservation method includes, for example, the method of checking the MAC (Media Access Control) address of the packet to raise the routing priority level of the packet from the streaming communication packet of that MAC address. Accordingly, even if a large amount of data is transferred between other streaming communication apparatuses, communication of the streaming communication apparatus raised in the priority level is favored and the bandwidth reserved. Another example includes restricting the bandwidth of a packet from a streaming communication apparatus having an address other than the address specifying bandwidth priority. In this method, the packet is buffered at the router apparatus side to disallow data transfer at a rate equal to or above 10 Mbps, for example. Accordingly, the remaining 90 Mbps in the 100 Base-TX Ethernet (Registered trademark), for example, may be used arbitrarily. Router apparatus 3 thus reserves a bandwidth based on a request packet according to, for example, any of the aforementioned methods.

Bandwidth allocation control process unit 115 gives priority to the communication of an apparatus from which a bandwidth reservation request packet has been transmitted. After the bandwidth has been reserved according to the request packet, an apparatus from which notification is not made is allocated the remaining bandwidth. Alternatively, the priority level of such apparatus may be set low. Bandwidth allocation control process unit 115 carries out general routing to execute setting of a relay path according to the destination IP address of the received packet in the case where bandwidth control is not carried out according to a request packet.

Upon receiving a bandwidth release request packet, bandwidth allocation control process unit 115 deletes from bandwidth allocation table 116 the IP address of the streaming communication apparatus 5 from which a bandwidth release request packet has been transmitted.

Bandwidth allocation table 116 has an IP address to which a bandwidth has been allocated by bandwidth allocation control process unit 115 and the requested bandwidth set in correspondence, as mentioned above.

Bandwidth reservation display unit 114 provides the display of whether a bandwidth reservation process is carried out or not. For example, when bandwidth allocation control process unit 115 is carrying out bandwidth allocation control according to a request packet, an LED (Light Emitting Diode) is turned on, The LED is not turned on when a bandwidth allocation control according to a request packet is not carried out.

Bandwidth reservation display unit 114 may also provide a display indicating the corresponding IP address, at what rate a bandwidth reservation is effected, and which physical port has the rate limited, at the setting interface of router apparatus 3. (For example, by gaining access to the IP address of the router on the Web to open the home page that allows confirmation of the setting of router apparatus 3.)

The process to allow the operation set forth above in streaming communication apparatus 5 and router apparatus 3 will be described hereinafter.

Figure 5:
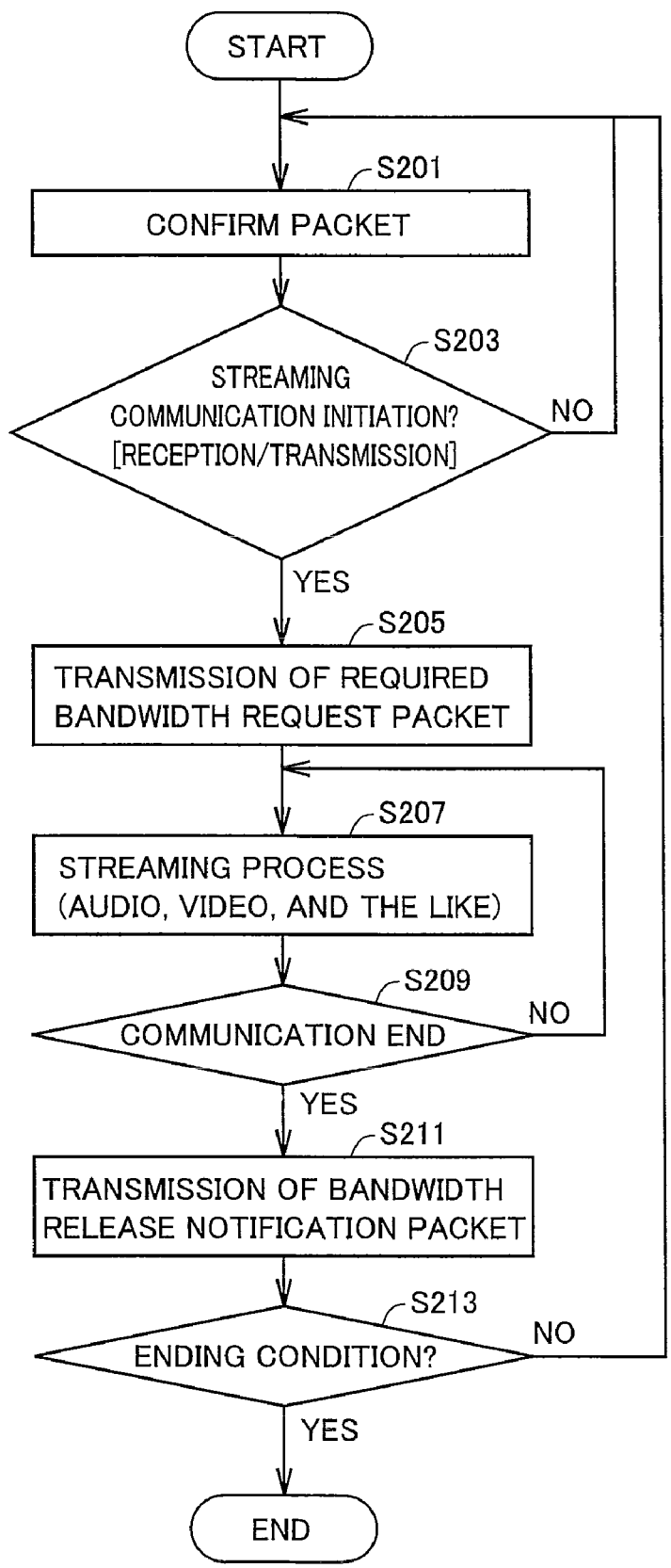
FIG. 5 is a flow chart of a process carried out by a streaming communication apparatus according to an embodiment of the present invention.

FIG. 5 is a flow chart representing a process carried out by streaming communication apparatus 5.

The process carried out by streaming communication apparatus 5 will be described with reference to FIG. 5.

At step S201, packet monitor and session information process unit 111 confirms reception of a self-addressed packet at communication I/F unit 109.

At step S203, packet monitor and session information process unit 111 determines whether the received packet is an initiation packet of streaming communication. At this stage, initiation of streaming communication is determined by a connection request message (INVITE), as described with reference to FIG. 3. Alternatively, determination is made whether there is a streaming communication initiation input via an operation unit by a user (not shown in FIG. 2).

When determination is made of not corresponding to an initiation of streaming communication (NO at step S203), control returns to step S201.

When determination is made of an initiation of streaming communication (YES at step S203), bandwidth reservation/release request transmission unit 110 transmits to router apparatus 3 a packet requesting reservation of the required bandwidth (step S205). The required bandwidth is calculated by packet monitor and session information process unit 111 based on the communication information written in the payload of the packet and required bandwidth retrieval table 118. When streaming communication is to be initiated from itself, packet monitor and session information process unit 111 directly notifies bandwidth reservation/release request transmission unit 110 the required bandwidth since the communication information is already known.

At step S207, audio video process unit 112 carries out communication of audio, video, and the like. At this stage, audio video process unit 112 reproduces the received packet as audio and video data, which is provided to display unit 106. Alternatively, in the case where streaming communication is to be initiated from itself, the audio/video data stored in memory device 119 is divided into packets for transmission to the other apparatus for communication.

At step S209, packet monitor and session information process unit 111 determines whether the streaming communication has ended or not. This determination is made by a communication end message (BYE), as described with reference to FIG. 3. Alternatively, determination is made based on whether the process of dividing audio/video data into packets by audio video process unit 112 has ended or not.

When determination is made that streaming communication has not yet ended (NO at step S209), the process of step S207 is carried out.

When determination is made that streaming communication has ended (YES at step S209), bandwidth reservation/ release request transmission unit 110 transmits a packet requesting release of the reserved bandwidth towards router apparatus 3 (step S211).

Finally at step S213, the control unit of streaming communication apparatus 5 (not shown in FIG. 2) determines whether the ending condition is satisfied or not. The process may be continued repeatedly unless an end command is provided from the user. Alternatively, the process may be set to end when the number of times of carrying out the processing set forth above arrives at a set number. Alternatively, the process may be set to end at the elapse of a predetermined time from the initiation of the process. When determination is made that the ending condition is not satisfied (NO at step S213), the process at step S203 is carried out. In contrast, when determination is made that the ending condition is satisfied (YES at step S213), the process ends.

By the process set forth above, streaming communication apparatus 5 transmits to router apparatus 3 a packet requesting reservation of the bandwidth required for streaming communication and a packet requesting release of the reserved bandwidth. Thus, stable streaming communication can be carried out.

FIG. 6 is a flowchart representing a process carried out by router apparatus 3.

The process carried out by router apparatus 3 will be described with reference to FIG. 6. Router apparatus 3 carries out the general routing process of executing setting of a relay path according to the destination IP address in the received packet after activation. Although the process set forth below of router apparatus 3 is carried out independent of the general routing process, the process shown in FIG. 6 is executed with priority over the general routing process in the case where a request packet is received.

At step S301, bandwidth allocation control process unit 115 confirms reception of a request packet at LAN communication I/F unit 113.

At step S303, bandwidth allocation control process unit 115 determines whether a request packet has been received at step S301. For example, an IP packet having a packet MAC address and an IP address both designating router apparatus 3 is identified as the request packet. When determination is made that a request packet is not received (NO at step S303), control proceeds to step S301.

When determination is made that a bandwidth reservation request packet has been received (reservation in step S303), control proceeds to step S305 where bandwidth allocation control process unit 115 reads out the information written in the payload of the packet, and identifies the bandwidth required for streaming communication. Then, the IP address of streaming communication apparatus 5 from which the request packet has been transmitted and the bandwidth to be allocated are registered in correspondence in bandwidth allocation table 116.

At step S307, bandwidth allocation control process unit 115 carries out a bandwidth reservation process. This method for bandwidth reservation includes a method employing various QoS algorithms for a specified address, restricting a bandwidth other than that of a specified address, and the like.

At step S309, bandwidth reservation display unit 114 provides a display indicating whether a bandwidth reservation process is carried out or not. For example, an LED is turned on when bandwidth allocation control process unit 115 is carrying out bandwidth allocation control according to a request packet.

Alternatively, display is provided indicating the corresponding IP address, at what rate a bandwidth reservation is effected, and which physical port has the rate limited, at the setting interface of router apparatus 3. (For example, by gaining access to the IP address of the router on the Web to open the home page that allows confirmation of the setting of router apparatus 3).

When determination is made that a bandwidth release request packet has been received (release at step S303), control proceeds to step S311 where bandwidth allocation control process unit 115 carries out a bandwidth release process with respect to the IP address of streaming communication apparatus 5 from which the bandwidth release request packet has been transmitted, and deletes the registration of the IP address in association with the bandwidth release process carried out and the allocated bandwidth from bandwidth allocation table 116. In addition, bandwidth reservation display unit 114 alters the bandwidth reservation display about the IP address of streaming communication apparatus 5 from which the bandwidth release request packet has been transmitted and the reserved bandwidth. For example, the LED is not turned on when bandwidth allocation control process unit 115 is not carrying out bandwidth allocation control according to a request packet.

At step S313, the control unit of router apparatus 3 (not shown in FIG. 4) determines whether the ending condition is satisfied or not. The process may be continued repeatedly unless an end command is provided from the user. Alternatively, the process may be set to end when the number of times of carrying out the processing set forth above arrives at a set number. Alternatively, the process may be set to end at the elapse of a predetermined time from the initiation of the process. When determination is made that the ending condition is not satisfied (NO at step S313), bandwidth allocation control process unit 115 returns to step S301. In contrast, when determination is made that the ending condition is satisfied (YES at step S313), the process ends.

By the process set forth above, router apparatus 3 carries out bandwidth control according to a request packet transmitted by streaming communication apparatus 5. Accordingly, stable streaming communication can be carried out.

According to streaming communication system 10 of the present embodiment, streaming communication apparatus 5 transmits to router apparatus 3 a packet requesting reservation of a bandwidth required for streaming communication. Router apparatus 3 reserves the required bandwidth according to the request packet. Thus, stable streaming communication can be carried out. Even in the case where streaming communication apparatus 5 is to carry out communication based on a protocol or compression format of which determination of the required bandwidth cannot be made by router apparatus 3, router apparatus 3 is notified of the required bandwidth by streaming communication apparatus 5, allowing stable streaming communication according to the bandwidth reserved by router apparatus 3.

In streaming communication system 10 of the present embodiment, streaming communication apparatus 5 notifies router apparatus 3 of the required bandwidth, the available time of the bandwidth, and the like. Therefore, the load in the routing process at router apparatus 3 can be alleviated. Thus, bandwidth control can be carried out efficiently without increasing the system cost.

According to streaming communication system 10 of the present embodiment, router apparatus 3 carries out bandwidth control on a port according to a request packet transmitted by streaming communication apparatus 5. Accordingly, extra limitation on another port is suppressed.

According to streaming communication system 10 of the present embodiment, an IP packet is used as a request packet.

It is therefore not necessary to add a new signal line or the like. Thus, an existing apparatus can be employed.

In streaming communication system 10 of the present embodiment, bandwidth control is carried out with respect to the IP address of a plurality of streaming communication apparatuses 5 from which a request packet has been transmitted. As compared with the conventional streaming communication carried out through one port allowing only the relevant communication to be given priority, bandwidth control can be carried out with respect to the IP address of each streaming communication apparatus 5 from which a request packet is transmitted. Therefore, the required rate can be ensured properly for each of a plurality of streaming communications occurring at the same time, and communication can be continued without unnecessarily cutting off the communication of the remaining ports.

According to streaming communication system 10 of the present embodiment, router apparatus 3 carries out bandwidth control according to a request packet from streaming communication apparatus 5. Accordingly, even if setting by a user is not made, bandwidth control can be carried out to ensure the quality of streaming communication. Therefore, the load on the user can be alleviated.

In streaming communication system 10 of the present embodiment, the existing procedure is employed for the procedure of streaming communication. Therefore, any existing communication can be carried out even if the communication is involved with a streaming communication apparatus 5 that does not take a configuration as described in the present embodiment.

It should be understood that the embodiments and examples disclosed herein are illustrative and non-restrictive in every respect. The scope of the present invention is defined by the terms of the claims, rather than the description above, and is intended to include any modification within the scope and meaning equivalent to the terms of the claims.

The invention claimed is:

1. A streaming communication system comprising:
a plurality of streaming communication apparatuses for streaming communication, and
a communication relay apparatus for controlling relay of a data packet between apparatuses connected on a network,
each said streaming communication apparatus including
a communication unit for transmitting and receiving said data packet, and
a request packet transmission unit for transmitting to said communication relay apparatus a request packet instructing bandwidth control for said streaming communication,
said communication relay apparatus including
a request packet reception unit for receiving said request packet, and
a bandwidth control unit for carrying out said bandwidth control of said data packet according to said request packet,
wherein in said request packet includes a reservation request packet including an instruction to reserve a bandwidth for said streaming communication on said network, and
wherein
said streaming communication apparatus further includes
a data storage unit for storing data used in streaming communication, and
a data determination unit for determining the bandwidth required for said streaming communication in a compression format of said data stored in said data storage unit, and
said request packet transmission unit transmits said reservation request packet based on a determination result by said data determination unit, and wherein said communication relay apparatus further includes a display process unit for displaying a physical port where said bandwidth control unit carries out control according to said reservation request packet received by said request packet reception unit.

2. The streaming communication system according to claim 1, wherein said communication relay apparatus further includes a display process unit for notifying a user that said bandwidth control unit is carrying out control according to said reservation request packet received by said request packet reception unit.

3. The streaming communication system according to claim 1, wherein said request packet transmission unit uses an IP packet as said reservation request packet.

4. The streaming communication system according to claim 1, wherein said data determination unit determines the bandwidth required for said streaming communication in the compression format of said data packet in response to reception of said data packet by said communication unit.

5. The streaming communication system according to claim 1, wherein
said data determination unit includes a table in which said compression format of data and a bandwidth required for said compression format are set in correspondence, and
said data determination unit determines said required bandwidth based on said table.

6. The streaming communication system according to claim 1, wherein said data determination unit determines the compression format of a data packet based on a payload type of said data packet used in said streaming communication.

7. The streaming communication system according to claim 1, wherein
said streaming communication uses an SIP protocol,
said data determination unit determines an initiation of streaming communication and the compression format of said data packet based on offer SDP information including a method and a response message to said method.

8. The streaming communication system according to claim 1, wherein said bandwidth control unit carries out control of reserving the bandwidth with respect to an address of said streaming communication apparatus from which said reservation request packet is transmitted in response to reception of said reservation request packet by said request packet reception unit.

9. The streaming communication system according to claim 8, wherein said communication relay apparatus further includes a storage unit for storing, in association with said reservation request packet from a plurality of said streaming communication apparatuses, an address of said streaming communication apparatus from which each said reservation request packet has been transmitted, and the bandwidth required for said streaming communication, included in each said reservation request packet, in correspondence.

10. The streaming communication system according to claim 8, wherein said bandwidth control unit carries out, when bandwidth control is carried out for a plurality of said streaming communication apparatuses, bandwidth control based on said reservation request packet with respect to an address of said streaming communication apparatus among said plurality of streaming communication apparatuses from which said reservation request packet has been transmitted, and control of allocating a remaining bandwidth equally with respect to the address of remaining said streaming communication apparatuses.

11. The streaming communication system according to claim 8, wherein said communication relay apparatus further includes a display process unit for displaying an address of said streaming communication apparatus whose said bandwidth control unit is carrying out control of reserving the bandwidth and the reserved bandwidth in correspondence.

12. The streaming communication system according to claim 1, wherein said request packet includes a release request packet including an instruction to release a bandwidth for said streaming communication.

13. The streaming communication system according to claim 12, wherein said bandwidth control unit carries out control of releasing a reserved bandwidth with respect to an address of said streaming communication apparatus from which said release request packet has been transmitted, in response to reception of said release request packet by said release packet reception unit.

14. The streaming communication system according to claim 13, wherein said bandwidth control unit carries out, when control is carried out of reserving the bandwidth with respect to an address of a plurality of said streaming communication apparatuses, control of releasing the bandwidth reserved with respect to an address of a predetermined streaming communication apparatus among the plurality of streaming communication apparatuses in response to said request packet reception unit receiving said release request packet from said predetermined streaming communication apparatus.

15. The streaming communication system according to claim 12, wherein said request packet transmission unit uses an IP packet as said release request packet.

16. The streaming communication system according to claim 1, wherein each said streaming apparatus and said communication relay apparatus are connected by a local area network.

* * * * *